United States Patent [19]

Perry et al.

[11] Patent Number: 5,503,217
[45] Date of Patent: Apr. 2, 1996

[54] METHOD OF MANUFACTURING METAL STRIP

[75] Inventors: Robert M. Perry, Hensingham; Barry G. Cortlett, Seaton, both of England

[73] Assignee: Davy McKee (Sheffield) Limited, Sheffield, United Kingdom

[21] Appl. No.: 304,412

[22] Filed: Sep. 12, 1994

Related U.S. Application Data

[63] Continuation of Ser. No. 200,940, Feb. 23, 1994, abandoned, which is a continuation of Ser. No. 969,143, filed as PCT/GB91/01233, Jul. 23, 1991, abandoned.

[30] Foreign Application Priority Data

Jul. 23, 1990 [GB] United Kingdom ............... 9016142

[51] Int. Cl.⁶ .................. B22D 11/00; B22D 11/20; B22D 11/22
[52] U.S. Cl. .................. 114/477; 164/454; 164/455
[58] Field of Search .................. 164/476, 452, 164/454, 455, 413, 414, 477

[56] References Cited

U.S. PATENT DOCUMENTS 2,058,447 10/1936 Hazelett ........................ 164/477
3,623,532 11/1971 Cofer .............................. 164/477
3,858,642 1/1975 Battison ......................... 164/429
4,793,169 12/1988 Ginzburg ........................ 164/476
4,958,677 9/1990 Kimura .......................... 164/476
4,962,808 10/1990 Hoffken ......................... 164/476
5,042,564 8/1991 Van Perlstein ................. 164/477

FOREIGN PATENT DOCUMENTS 1-130847 5/1989 Japan ............................ 164/477
9000100 1/1990 WIPO ............................ 164/477

OTHER PUBLICATIONS

Recent Developments of Advanced Rolling Mills, Hitachi Review, vol. 37, No. 4, Aug. 1988, pp. 170–179.

Primary Examiner—P. Austin Bradley
Assistant Examiner—I.-H. Lin
Attorney, Agent, or Firm—Lee, Mann, Smith, McWilliams, Sweeney & Ohlson

[57] ABSTRACT

In the manufacture of metal strip, the strip is cast in a caster (1) and it is then passed through a temperature control zone (5) where the temperature of the strip is brought to a predetermined level. To adjust the temperature of the strip, as its speed of passage through the temperature control zone varies, the temperature control means must be adjusted. Until operating conditions have stabilized, it is necessary to hang a part of the strip leaving the caster in a loop so as to accommodate variations in operating conditions.

2 Claims, 2 Drawing Sheets

METHOD OF MANUFACTURING METAL STRIP

This application is a continuation, of application Ser. No. 08/200,940, filed Feb. 23, 1994, abandoned, which is a continuation of application Ser. No. 07/969,143, filed as PCT/GB91/01233, Jul. 23, 1991, abandoned.

BACKGROUND OF THE INVENTION

This invention relates to a method of, and apparatus for, manufacturing metal strip in which the metal strip is cast in a roll caster.

It is known from JP-A-56-119607 for a metal slab to be cast in a continuous casting mould and for the slab to be hot rolled in a rolling mill train to metal strip which is subsequently coiled in coils of a convenient size. It is also known from the same Japanese specification for a metal workpiece to be cast in a roller caster and continuously conveyed through a looper into a heating furnace where its temperature is raised to a rolling temperature subsequent to the workpiece being rolled down to strip in a rolling mill train. The speed of casting and the rolling speed in the in-line rolling mill train have to be synchronised and the looper present at the inlet end of the heating furnace is used to take up any differences in these speeds. Pinch roll assemblies are provided between the outlet of the roll caster and the looper so that, in use, the looped workpiece is present between the pinch roll assemblies and the entrance to the heating furnace.

However, if the metal strip is cast to substantially the required thickness in the roll caster and is not subsequently subjected to rolling in an in-line rolling mill train, then following the caster the strip passes through a temperature control zone where the temperature of the strip is controlled. On leaving the temperature control zone, the temperature of the strip has to be within a band close to a predetermined temperature in order to achieve the required material condition and properties. During the start up of the casting process, the speed of the strip can vary dramatically whilst the strip temperature leaving the caster is relatively close to its steady casting temperature, hence, the strip temperature in the temperature control zone will also vary until steady state casting speed is achieved.

SUMMARY OF THE INVENTION

According to a first aspect of the present invention, in a method of manufacturing metal strip, the metal strip is cast in a roll caster and characterised in that, from the start of the casting process to at least the time when steady state operating conditions are achieved, the metal strip continuously exiting from the outlet of the roll caster is allowed to hang unhindered in a loop prior to passing through a pinch roll assembly into a temperature control zone where the temperature of the strip is controlled.

By arranging for the part of the strip exiting the roll caster to hang in a loop immediately it leaves the roll caster and before it passes through the rolls of the pinch roll assembly, that part of the strip is separated by the pinch roll assembly from the part of the strip in the temperature control zone and so the speed of these two parts of the strip can be quickly adjusted relative to each other and the length of the strip hanging in the loop adjusts itself accordingly. The required temperature of the strip existing in the temperature control zone is achieved by adjusting any temperature control means, which can be cooling, heating, insulating or any combination thereof.

It is convenient for the metal strip to be coiled after it has passed through the temperature control zone. A close wound coil is best provided by the coiler exerting a tension to the strip. This tension must be resisted so that no detrimental tension is applied to the the strip exiting the strip caster. Sets of pinch rolls are provided to control the speed of the strip as it passes through the temperature control zone whilst the coiler pulls against them to provide adequate coiling tension. The present invention enables the casting speed and the coiling speed to be adjusted independently of each other until the temperature of the strip leaving the control zone is adjusted to the required temperature band.

To achieve better temperature control of the strip in the zone, it is desirable for the strip passing through the zone to be under longitudinal tension so that the material tends to be flat and more uniform heat treatment of the strip can be achieved.

Downstream of the control zone, there may be two further sets of pinch rolls arranged in tandem and, between these further sets of pinch rolls, the longitudinally extending edges of the strip may be trimmed, milled or otherwise conditioned. In addition, the strip may be slit into multiple strip widths. Optionally in addition, a rolling mill stand may be located between the sets of pinch rolls to provide a reduction on the thickness of the strip to provide strip in the required condition.

According to a second aspect of the invention, apparatus for manufacturing metal strip comprises a roll caster arranged to cast metal strip; a temperature control zone arranged to control the temperature of metal strip moved in the direction of its length therethrough, the inlet of said control zone being spaced apart horizontally from the outlet of the roll caster; a pinch roll assembly located adjacent to, and upstream of, the inlet of said control zone; characterised in that provision is made so that, in use, the metal strip continuously exiting from the outlet of the roll caster is free to hang unhindered in a loop of adjustable length prior to passing through the pinch roll assembly into the temperature control zone.

BRIEF DESCRIPTION OF THE DRAWINGS

In order that the invention may be more readily understood, it will now be described, by way of example only, with reference to the accompanying drawings, in which.

DESCRIPTION OF THE PREFERRED EMBODIMENT

Figure 1:
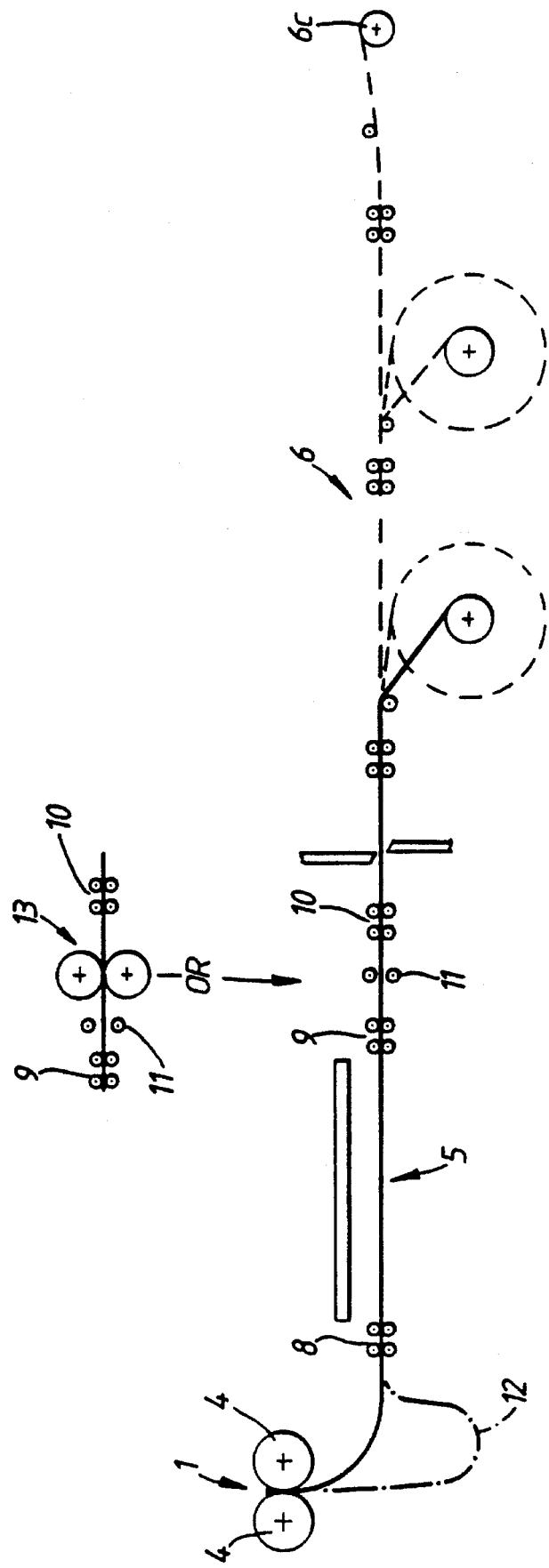
FIG. 1 is a diagrammatic side elevation of apparatus for manufacturing metal strip.

A twin-roll caster 1 is mounted on a platform 2 arranged above ground level and over a pit 3. The twin-roll caster includes a pair of rolls 4 arranged with their longitudinal axes horizontal. A temperature control zone, shown generally by reference numeral 5, extends away from the roll caster in a horizontal direction towards a coiling section 6. At the end of the zone 5 closest to the twin-roll caster there is a diverter roll 7 followed by a first set of pinch rolls 8, where at least one pair of the rolls of which can be used to steer metal strip passing between the rolls. Immediately before the coiling section 6 there are second and third sets of pinch rolls in tandem, indicated by reference numerals 9 and 10, respectively.

In use, strip material produced in the twin-roll caster in a continuous process is hung in the form of a loop 12 in the pit 3 and then passes over the diverter roll 7 and into the first set of pinch rolls 8. Thus, between the outlet of the caster and the pinch rolls 8, the strip material hangs under its own weight. Between the pinch rolls 8 and 9 the strip material can be put under longitudinal tension by creating a resistance to rotation in the pinch rolls 8. This causes the strip material to lie flat in the temperature control zone 5.

Figure 2:
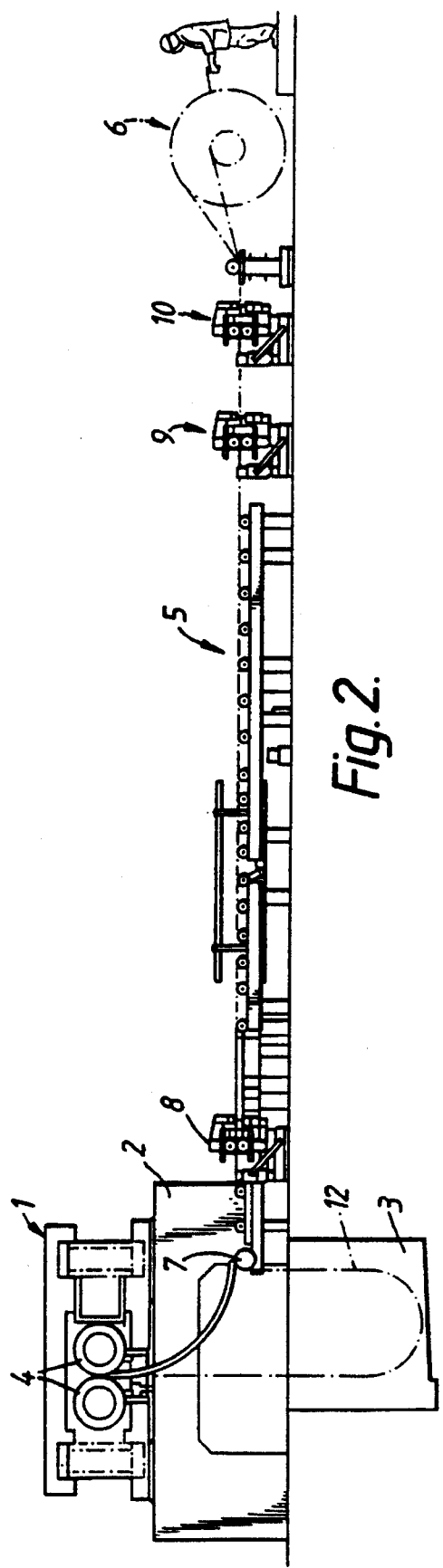
FIG. 2 is a side elevation of a strip line.
Figure 3:
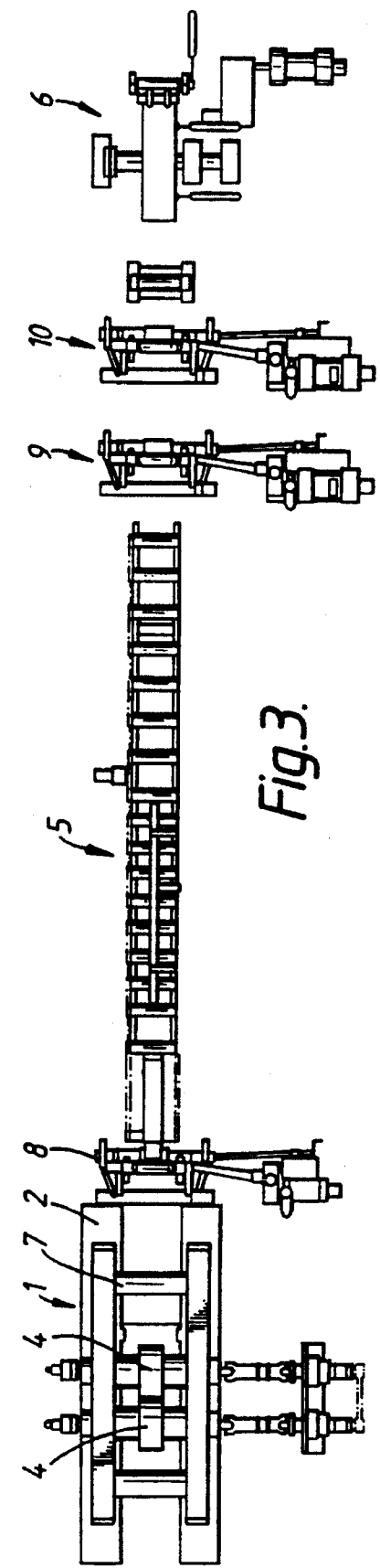
FIG. 3 is a plan of the strip line shown in FIG. 2.

Between the sets of pinch rolls 9 and 10 a different tension can be applied to the strip material by creating a resistance to rotation in the pinch rolls 9. In the region between pinch rolls 9 and 10 there is an edge conditioning unit 11 (see FIG. 1) which can, for example, be an edge trim shear, or a grinding or milling machine. A slitting station may also be provided. Again, the fact that the strip material is under longitudinal tension enables the edge conditioning to be effected efficiently. From the pinch rolls 10 the strip material passes to one or other of a pair of similar coilers in the coiling section 6, only one coiler being shown in FIGS. 2 and 3. Strip tension for close coiling is achieved by creating a resistance to the coiler in pinch rolls 10.

The temperature control zone may comprise heat insulating hoods, e.g., ENCO panels, fitted over the roller table to conserve heat in the cast strip or, alternatively, heat may be added to the strip material by way of electrical induction or gas heaters, or it can be removed from the strip material by way of water or water and air sprays. Part of the temperature control zone may comprise heat retention panels in order to allow the heat present in the casting to equalise across its width and, thereafter, to be followed by a cooling region in which cooling liquid is sprayed on to the strip material to obtain more uniform temperature control of the strip material across its entire width.

The present invention enables strip material of the correct metallurgical composition to be formed and this may be wound in tightly wound coils with "clean" edges.

A rolling mill 13 (see FIG. 1) may optionally be positioned after the pinch rolls 9 and downstream of the edge conditioner to provide a degree of rolling to the strip material prior to it being coiled.

In order to start a cast, a coil of starter strip, which is thinner and narrower than that of the strip to be cast, is located at a coiler 6c and the outer end of the starter strip material is fed back through the pinch rolls 10 and 9 and through the temperature control zone and the pinch rolls 8 and into the outlet end of the twin-roll caster. A loop of this starter strip is formed in the pit 3. The coiler and pinch rolls can then be operated so that the starter strip is tensioned to the correct values along its length and the molten metal introduced into the gap between the rolls 4 starts to solidify in contact with the starter strip. As the cast material is forced out from the twin roll caster, the length of the loop in the pit will increase whilst the coiler speed is also increased to follow that of the caster. The cast material leaving the loop in the pit passes through the pinch rolls 8, 9 and 10 and through the temperature control zone 5. As the leading end of the cast strip approaches the coiler section 6, it may be severed on the fly from the starter strip following the pinch rolls 10 and then connected on to a coiler of the coiler section 6.

Strip passing from zero tension to a tension part of a processing line can wander from side to side. This is not acceptable and it is overcome by the use of the pinch rolls 8 to steer the metal strip.

We claim:

1. A method of manufacturing metal strip comprising the steps of:

introducing molten metal into the gap between a pair of rotating rolls of a twin roll caster to form a metal strip, exiting the metal strip from the gap, allowing the metal strip to hang unhindered under its own weight in a loop, passing the strip between the rotating rolls of a first pinch roll assembly into a temperature control zone, passing the strip through the temperature control zone to control the temperature of the strip and exiting the strip from the temperature control zone between the rotating rolls of a second pinch roll assembly, and subsequently coiling the strip, and wherein from the start of the casting process to the time when steady state operating conditions are achieved the length of the loop is allowed to change in consequence of a speed difference between the rolls of the caster and the rolls of the first pinch roll assembly, and the speed difference between the rolls of the first and second speed pinch roll assemblies is adjusted to keep the strip in the temperature control zone under longitudinal tension.

2. A method of manufacturing metal strip as claimed in claim 1 wherein subsequent to exiting the strip between the rolls of the second pinch roll assembly and prior to coiling the strip, the longitudinal edges of the strip are conditioned.

* * * * *